United States Patent
Etienne et al.

(10) Patent No.: US 10,710,481 B2
(45) Date of Patent: Jul. 14, 2020

(54) FORMING OF A COVER ELEMENT FOR A MOTOR VEHICLE SEAT OR THE INTERIOR OF A MOTOR VEHICLE

(71) Applicant: FAURECIA SIEGES D'AUTOMOBILE, Nanterre (FR)

(72) Inventors: Fabrice Etienne, Bavilliers (FR); Julie Thomas, Les Aynans (FR); Didier Fouinat, Saint Cheron (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 632 days.

(21) Appl. No.: 15/165,850

(22) Filed: May 26, 2016

(65) Prior Publication Data

US 2016/0375808 A1  Dec. 29, 2016

(30) Foreign Application Priority Data

Jun. 29, 2015  (FR) ..................... 15 56091

(51) Int. Cl.
| | | |
|---|---|---|
| *B60N 2/58* | (2006.01) | |
| *B60R 13/02* | (2006.01) | |
| *B29C 70/34* | (2006.01) | |
| *B29C 44/08* | (2006.01) | |
| *B29K 311/08* | (2006.01) | |
| *B29K 105/12* | (2006.01) | |
| *B29K 623/00* | (2006.01) | |

(Continued)

(52) U.S. Cl.
CPC ........... *B60N 2/5891* (2013.01); *B29C 44/08* (2013.01); *B29C 70/345* (2013.01); *B60R 13/0212* (2013.01); *B29C 44/1228* (2013.01); *B29K 2105/12* (2013.01); *B29K 2311/08* (2013.01); *B29K 2313/00* (2013.01); *B29K 2623/06* (2013.01); *B29K 2623/12* (2013.01); *B29L 2031/58* (2013.01)

(58) Field of Classification Search
None
See application file for complete search history.

(56) References Cited

U.S. PATENT DOCUMENTS

| | | | | |
|---|---|---|---|---|
| 3,957,501 A | * | 5/1976 | Matsuda | ................ C04B 28/26 106/605 |
| 5,544,937 A | * | 8/1996 | Hanagan | ................ B29C 44/12 297/195.12 |

(Continued)

FOREIGN PATENT DOCUMENTS

| | | |
|---|---|---|
| EP | 0019748 A1 | 12/1980 |
| FR | 2941657 A1 | 8/2010 |

(Continued)

OTHER PUBLICATIONS

Preliminary Search Report in French Patent Application No. 1556091, dated Apr. 29, 2016, 2 pages.

*Primary Examiner* — Monica A Huson
*Assistant Examiner* — Kelsey C Grace
(74) *Attorney, Agent, or Firm* — Moreno IP Law LLC

(57) ABSTRACT

A method of manufacturing a cover element for a motor vehicle comprises placing, in a mold, a stack formed at least of a covering material made of textile, of leather, of skin, or of a synthetic material, and of a foam layer at the rear surface of the covering material, the foam layer integrating reinforcing elements.

14 Claims, 3 Drawing Sheets

(51) Int. Cl.
   *B29L 31/58* (2006.01)
   *B29C 44/12* (2006.01)

(56) References Cited

U.S. PATENT DOCUMENTS

| | | | | |
|---|---|---|---|---|
| 5,722,729 | A * | 3/1998 | Carilli | A47C 7/021 297/452.55 |
| 6,685,862 | B1 * | 2/2004 | Hanagan | B29C 44/086 156/213 |
| 2005/0266232 | A1 * | 12/2005 | Wang | B32B 27/08 428/323 |
| 2006/0029751 | A1 * | 2/2006 | Cowelchuk | B29C 41/08 428/31 |

FOREIGN PATENT DOCUMENTS

| | | |
|---|---|---|
| JP | 0361028 A | 3/1991 |
| WO | 2014054299 A1 | 4/2014 |

* cited by examiner

US 10,710,481 B2

FORMING OF A COVER ELEMENT FOR A MOTOR VEHICLE SEAT OR THE INTERIOR OF A MOTOR VEHICLE

BACKGROUND

The present disclosure generally relates to motor vehicles and, more particularly to the forming of lining elements for a seat element (rear panel of a backrest, of a headrest, lateral seat casing, etc.) or for the interior of a vehicle (door panel, headliner, rear shelf, etc.). The present disclosure more specifically relates to the forming of a cover element having its rear surface comprising a foam layer.

DISCUSSION OF PRIOR ART

Rear panels of motor vehicle seats and lateral casings are usually formed by plastic injection parts, covered sheet metal, a lining which is stretched and attached to the metal structure of the seat via plastic profiles, or also by the use of a plastic frame attached to the metal structure or assembled with the cap of the upholstery of the front surface of the seat.

A specific category of rear panels to which the present description applies comprises a foam layer which is relatively thin as compared with the thickness of the backrest, the foam layer being covered with a covering material made of leather, of skin, of woven or nonwoven textile, of synthetic material, etc., defining the apparent surface of the rear panel.

An example of a seat backrest equipped with a rear panel of this type is described in document FR A 2941657.

SUMMARY

An embodiment overcomes all or part of the disadvantages of known techniques for forming an element for covering a seat or the interior of a motor vehicle equipped with a foam layer on its rear surface.

An embodiment provides a solution reinforcing the mechanical resistance of such a cover element.

Thus, an embodiment provides a method of manufacturing a cover element for a motor vehicle, comprising the steps of:

placing, in a mold, a stack formed at least of a covering material made of textile, of leather, of skin, or of a synthetic material, and of a foam layer on the rear surface side of the covering material, the foam layer integrating reinforcing elements; and carrying out a forming to define the shape of the cover element.

According to an embodiment, the reinforcing elements are a sheet of plastic, metal, or glass fibers.

According to an embodiment, the reinforcing elements are fibers selected from among natural or synthetic glass fibers, in sections from 1 mm to 2 cm long.

According to an embodiment:
the reinforcing elements are deposited on a transfer film;
the foam is sprayed on the reinforcing elements and the transfer film; and
the foam—reinforcing element—transfer film assembly is placed on the rear surface of the covering material.

According to an embodiment:
the reinforcing elements are deposited on the rear surface of the covering material; and
the foam is sprayed on the reinforcing elements and the rear surface of the covering material.

According to an embodiment, the covering material is held by suction at least until the mold is closed.

According to an embodiment, the forming is a cold forming.

According to an embodiment, the forming is a hot forming.

According to an embodiment, the cover element comprises foams having different densities and/or hardnesses.

According to an embodiment, the cover element is a rear panel of a backrest of a motor vehicle seat.

According to an embodiment, the cover element is a door panel or an interior headliner of a motor vehicle.

An embodiment provides a cover element for a motor vehicle seat comprising:
a covering material made of textile, of leather, of skin, or of a synthetic material; and
a foam layer integrating reinforcing elements.

According to an embodiment, the cover element is obtained by implementation of the described method.

According to an embodiment, the cover element has a non-uniform thickness in the range from 1 to 50 mm.

An embodiment provides a seat element for a motor vehicle, comprising a cover element.

An embodiment provides a motor vehicle seat comprising at least one seat element.

The foregoing and other features and advantages will be discussed in detail in the following non-limiting description of specific embodiments in connection with the accompanying drawings.

DETAILED DESCRIPTION

Figure 1:
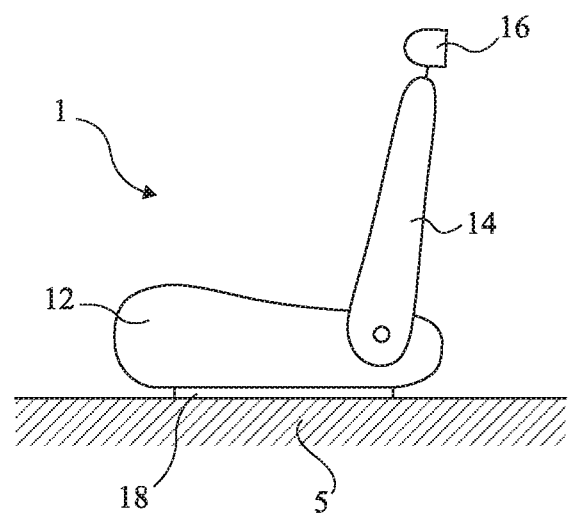
FIG. 1 is a simplified lateral view of a motor vehicle seat.

For clarity, only those steps and elements which are useful to the understanding of the described embodiments have been shown and will be detailed. In particular, the forming of the other seat elements has not been detailed, the described embodiments being compatible with any usual forming of upholstery attached to a frame.

It should be noted that, in the drawings, the structural and/or functional elements common to the different embodiments may be designated with the same reference numerals and may have identical structural, dimensional, and material properties.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings. Unless otherwise specified, expressions approximately, substantially, and in the order of mean to within 10%, preferably to within 5%.

FIG. 1 is a simplified lateral view of a motor vehicle seat 1. Such a seat comprises a seat bottom piece 12 having a backrest 14 jointed thereto and most often topped with a headrest 16. Seat bottom piece 12, backrest 14, and headrest 16 each comprise upholstery fastened to their frame, generally made of metal. The frame of seat bottom piece 12 may be connected to floor P of the vehicle by a slide rail mechanism 18. Seat 1 may also comprise one or a plurality of armrests (not shown).

Reference will be made hereafter to a rear panel of backrest 14 of seat 1. However, unless otherwise specified, all that will be described hereafter more generally applies to any cover element for which the same problems are posed, for example, the lateral casings of the seat, a rear headrest panel, a door panel of the vehicle, the headliner (ceiling) of the vehicle interior, etc.

Figure 2:
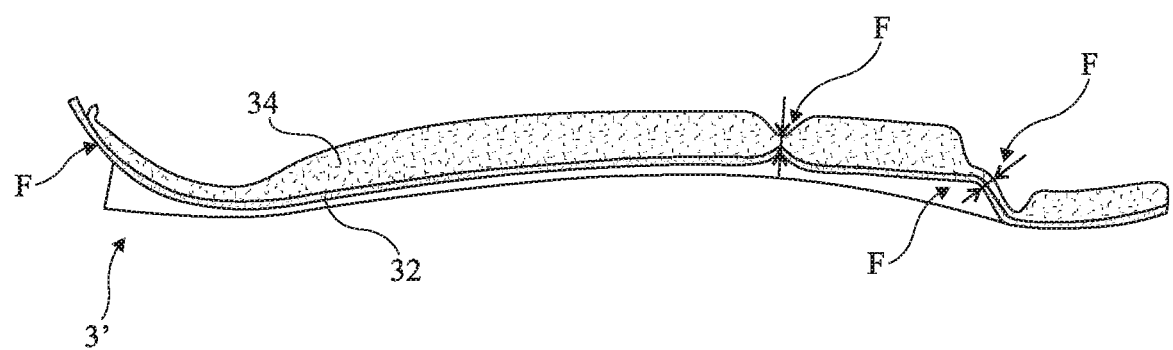
FIG. 2 is a cross-section view illustrating an embodiment of a rear panel of a seat backrest.

FIG. 2 is a cross-section view illustrating the forming of a rear panel 3 of a seat backrest of the type described in above-mentioned document FR-A-2941657.

Panel 3 is formed of a stack of a covering material 32, for example, made of textile (woven or not), of leather, of skin, or of a synthetic material, and of a foam layer 34. Panel 3 defines the final shape and the aspect of the rear side of the backrest (14, FIG. 1). In particular, foam layer 34 enables to give rear panel 3 a stiffness greater than that of the covering material. Further, the forming of foam layer 34 enables to vary the shape of the panel (for example, marks F), for example, in terms of thickness of foam layer 34, of curvature thereof, by forming areas recessed with respect to the apparent surface (for example, for a map pocket), etc.

As compared with a plastic shell, the advantages of this technique are, among others, a weight gain, an assembly by stitching to the rest of the backrest cap, and an easy manufacturing. As compared with a stretched piece of covering material, the advantages are, among others, a space gain by enabling to follow at closest the metal structure of the backrest frame. Further, different foam hardnesses and/or densities may be provided in the rear panel, for example, according to areas. Cover element 3 thus defines not only the shape but also the finishing of the apparent surface of the cover element.

Figure 3A:
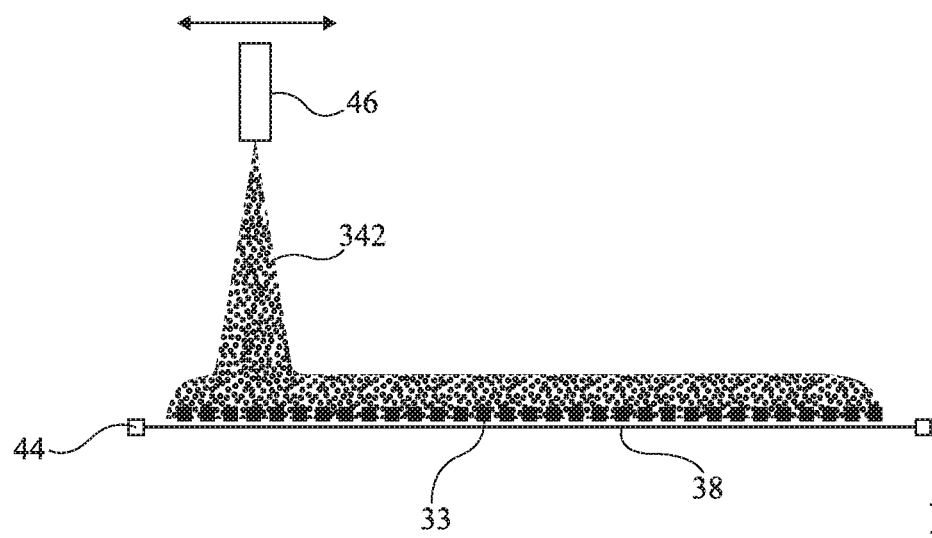
FIGS. 3A, 3B, and 3C are cross-section views illustrating an embodiment of a cap.
Figure 3B:
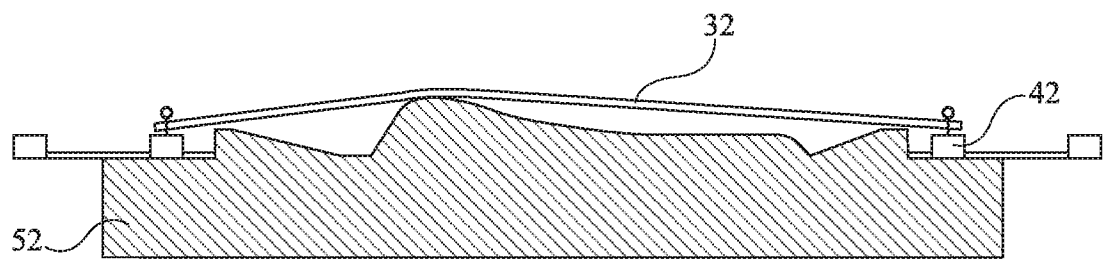
Figure 3C:
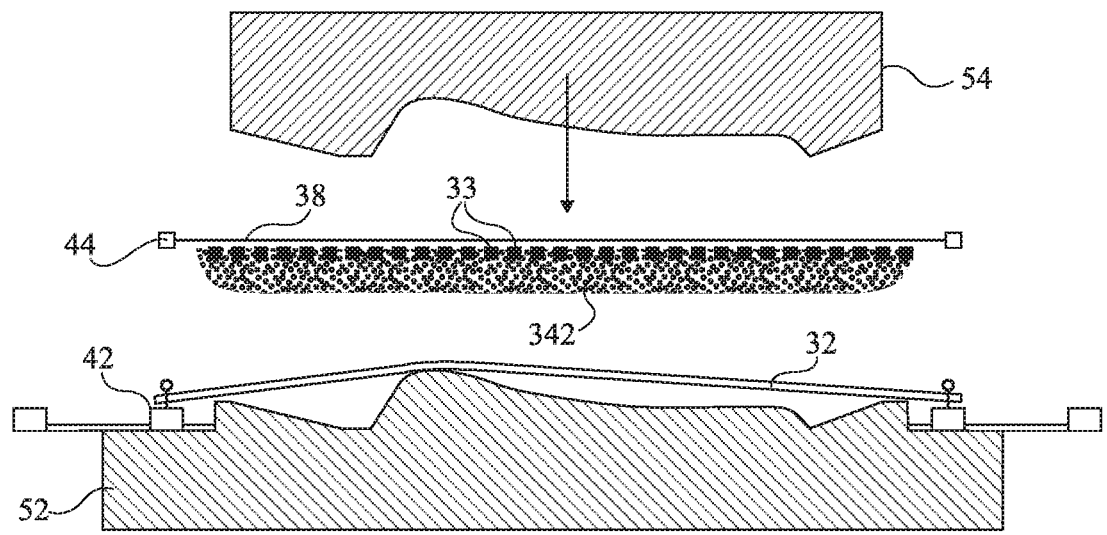

FIGS. 3A, 3B, and 3C are cross-section views illustrating an embodiment of a cover element 3. FIG. 3A shows a step of preparing foam layer 34. FIG. 3B shows a step of preparing covering material 32. FIG. 3C illustrates the forming of the cover element.

Figure 4:
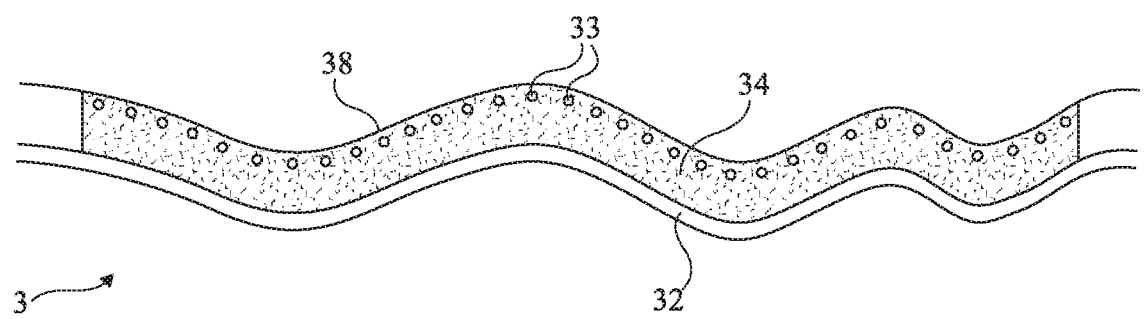
FIG. 4 is a cross-section view of the cap resulting from the embodiment of FIGS. 3A to 3C.

FIG. 4 is a cross-section view showing the obtained cap 3.

In a preparation step (FIG. 3A), a transfer film 38, for example, made of polyethylene or of polypropylene, is stretched on a support frame 44. According to the example of FIG. 3A, a fiber sheet 33 is placed on the transfer film. Then, foam 342 is sprayed, by means of a spraying tool 46, on a first surface of the transfer film. Transfer film 38 is flexible and has a relatively small thickness as compared with the thickness of sprayed foam 46. The foam starts polymerizing in this state on the transfer film.

In another preparation step (FIG. 3B), a piece of covering material 32 is placed in a frame 42. Then, covering material 32 is stretched above a die 52 of a mold 5 (FIG. 3C) or forming press, having its die 52 and a punch 54 defining the shapes desired for cover element 3. Die 52 defines the apparent (external) surface of cover element 3. Punch 54 defines the hidden (internal) surface of the cover element. Covering material 32 is placed with its apparent surface against die 52. According to an alternative embodiment, covering material 32 is directly positioned on die 52 and fastened thereto, for example, by means of point-like stretching devices (for example, hooks assembled on springs attached to a slide rail).

The preparation steps of FIGS. 3A and 3B are carried out separately in any order.

Then (FIG. 3C), the film 38—sheet 33—foam 342 assembly is placed on covering material 32, with foam surface 342 against the rear surface of covering material 32. Mold 5 is then closed for the time necessary for the foam to fully polymerize. In the example of FIG. 3C, a cold forming is provided and advantage is then taken from the fact that the foam has started polymerizing on transfer film 38. Further, the presence of transfer film 38 avoids having to provide, on the side of punch 54, a mold release agent, the transfer film preventing the foam from adhering to punch 54. In the case of the forming of upholstery for a seat element, transfer film 38 may or not be kept on assembly of cover element 3 to the rest of the cap.

FIG. 4 illustrates the obtained cap 3, taken out of mold 5. Due to the thickness of foam layer 34, cap 3 keeps the shape given by the press. Fiber sheet 38 gives cap 3 additional stiffness.

Figure 5A:
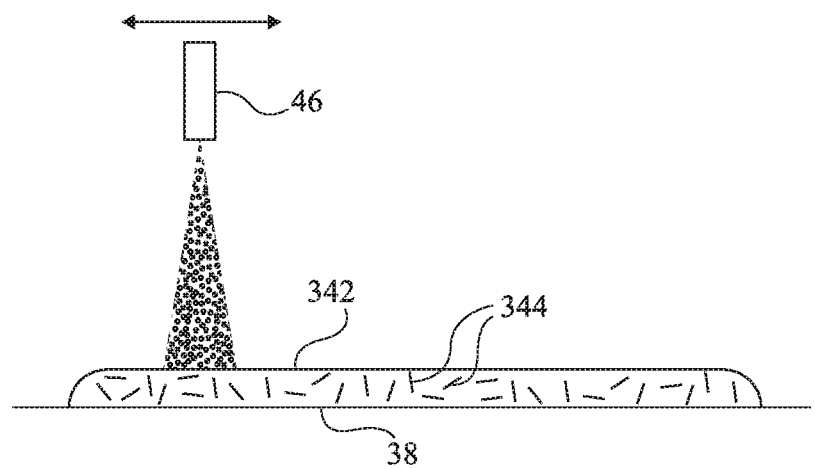
FIGS. 5A and 5B are cross-section views illustrating steps of the method according to alternative embodiments.
Figure 5B:
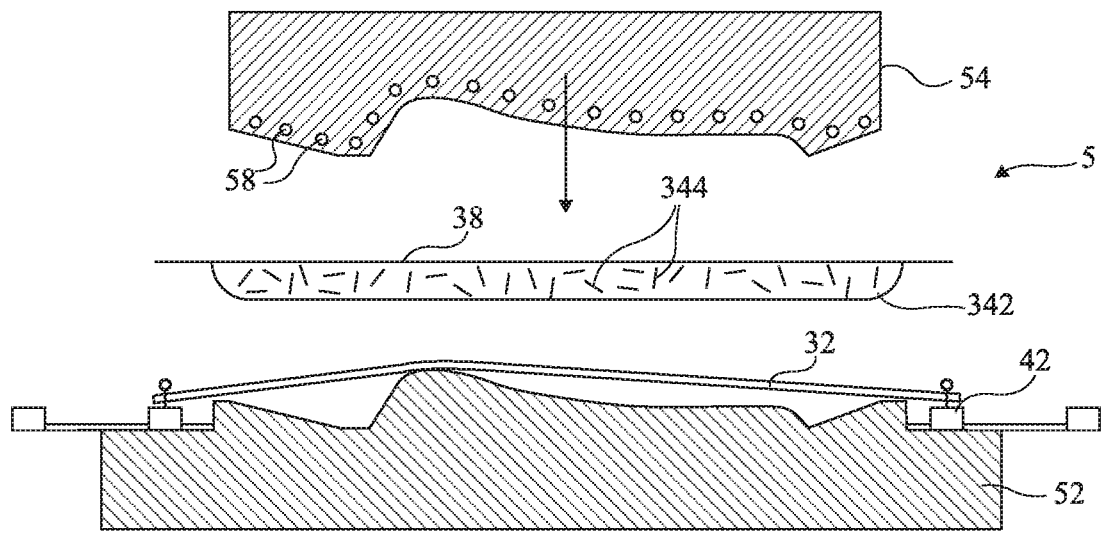

FIGS. 5A and 5B are cross-section views illustrating steps according to alternative embodiments. FIG. 5A shows a variation of the step of preparing foam layer 34 of FIG. 3A. FIG. 5B shows a variation of the forming of the cap of FIG. 3C.

According to the variation of FIG. 5A, the fiber sheet is replaced with sections (for example, from 1 mm to 2 cm long) of glass fibers 344, or other natural or synthetic fibers, sprayed with foam 342 or deposited at the surface of transfer film 38 before spraying of foam 342.

According to the variation of FIG. 5B, not necessarily related to FIG. 5A, but more particularly advantageous in the case where the foam is directly sprayed on the covering material, a hot forming is carried out. For example, mold 5 and, more particularly punch 54 of the mold, is heating (heating symbolized by heating elements 58). The hot forming is preferably performed at a temperature in the range from 40 to 80 degrees.

According to another alternative embodiment, not shown, applied to a hot forming, foam 342 is directly sprayed on the rear surface of the covering material, possibly after fibers or a sheet of fibers have been placed on the rear side of covering material 32.

According to still another variation, not shown, die 52 of forming mold 5 comprises suction channels. Thus, covering material 32 is placed against die 52 by suction to be positioned. This eases the indexing of the assembly lines in the die, in particular when covering material 32 is formed of different materials (for example, fabric and vinyl, fabrics of different colors, etc.). Further, the function of punch 54 is then limited to forming foam 342 while, with no suction, punch 54 has to both deform covering material 32 and form foam 342. The suction is either continued all along the forming, or stopped once the mold is closed.

The obtained cap 3 for example has a thickness which is not necessarily uniform, in the range from 1 to 50 millimeters, preferably from 2 to 25 millimeters. The thickness may further vary according to the areas of the cap.

The reinforcing elements (glass fibers, sheet of metal, plastic, glass fibers, etc.) are not necessarily present all over cap 3. In particular, the stiffer areas of the cap may be desired to be local.

Further, the layout of the reinforced areas takes into account, for example, the forming of a map pocket.

Embodiments have been described. Various alterations, modifications, and improvements will occur to those skilled in the art. In particular, although the embodiments have been described in relation with an example of a rear backrest panel, they more generally apply to any seat element needing a portion which is stiffer than the front surface receiving the occupant and, more generally, to any covering of the interior of a vehicle. For example, it may apply to rear panels of back seats of a vehicle, or even to trunk linings. Further, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of manufacturing a cover element for a motor vehicle, comprising the steps of:
   placing, in a mold, a stack formed at least of a covering material made of textile, of leather, of skin, or of a synthetic material, and of a foam layer at the rear surface of the covering material, the foam layer including reinforcing elements, wherein the covering material is held by suction at least until the mold is closed; and
   carrying out a forming to define the shape of the cover element.

2. The method of claim 1, wherein the reinforcing elements are a sheet of plastic, metal, or glass fibers.

3. The method of claim 1, wherein the reinforcing elements are fibers selected from among natural or synthetic glass fibers, in sections from 1 mm to 2 cm long.

4. The method of claim 1, wherein:
   the reinforcing elements are deposited on a transfer film;
   the foam is sprayed on the reinforcing elements and the transfer film; and
   the foam—reinforcing element—transfer film assembly is placed on the rear surface of the covering material.

5. The method of claim 1, wherein:
   the reinforcing elements are deposited at the rear surface of the covering material; and
   the foam is sprayed on the reinforcing elements and the rear surface of the covering material.

6. The method of claim 1, wherein the forming is a cold forming.

7. The method of claim 1, wherein the forming is a hot forming.

8. The method of claim 1, wherein the cover element comprises foams having different densities and/or hardnesses.

9. The method of claim 1, wherein the cover element is a rear panel of a backrest of a motor vehicle seat.

10. The manufacturing method of claim 1, wherein the cover element is a door panel or an interior headliner of a motor vehicle.

11. A cover element for a motor vehicle seat comprising:
    a covering material made of textile, of leather, of skin, or of a synthetic material; and
    a foam layer including reinforcing elements,
    the cover element being obtained by the implementation of the method of claim 1.

12. The cover element of claim 11, having a non-uniform thickness in the range from 1 to 50 nm.

13. A motor vehicle seat element comprising the cover element of claim 11.

14. A motor vehicle seat comprising at least one seat element of claim 13.

* * * * *